US009514577B2

(12) United States Patent
Ahn et al.

(10) Patent No.: US 9,514,577 B2
(45) Date of Patent: Dec. 6, 2016

(54) INTEGRATING ECONOMIC CONSIDERATIONS TO DEVELOP A COMPONENT REPLACEMENT POLICY BASED ON A CUMULATIVE WEAR-BASED INDICATOR FOR A VEHICULAR COMPONENT

(71) Applicant: International Business Machines Corporation, Armonk, NY (US)

(72) Inventors: Hyung-il Ahn, San Jose, CA (US); Matthew Denesuk, Ridgefield, CT (US); Axel Hochstein, San Jose, CA (US); Ying Tat Leung, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/498,693

(22) Filed: Sep. 26, 2014

(65) Prior Publication Data

US 2016/0093116 A1     Mar. 31, 2016

(51) Int. Cl.
*G01R 31/3187*     (2006.01)
*G07C 5/00*     (2006.01)
(Continued)

(52) U.S. Cl.
CPC .............. *G07C 5/006* (2013.01); *B60K 35/00* (2013.01); *G07C 5/0808* (2013.01)

(58) Field of Classification Search
CPC . G01R 31/42; G01R 31/3679; G01N 33/2888; G01N 29/11; G07C 5/006; B60K 35/00; G01M 17/00
(Continued)

(56) References Cited

U.S. PATENT DOCUMENTS 5,280,223 A    1/1994   Grabowski
5,791,441 A    8/1998   Matos et al.
(Continued)

FOREIGN PATENT DOCUMENTS

CN    103778339 A    5/2014
EP    0126402 A2    11/1984
(Continued)

OTHER PUBLICATIONS

IP.com, Method for Visual Life Indication of Flash Based Storage Devices, IPCOM000236342D, Apr. 21, 2014.
(Continued)

*Primary Examiner* — Melissa Koval
*Assistant Examiner* — Trung Nguyen
(74) *Attorney, Agent, or Firm* — Ryan, Mason & Lewis, LLP

(57) ABSTRACT

Methods, systems, and computer program products for generating a vehicular component replacement policy are provided herein. A method includes, for each of multiple lifetime wear indicator functions associated with a vehicular component, wherein each lifetime wear indicator function comprises a transformed time scale plotting wear indicator values over a period of time, determining multiple corresponding candidate threshold values on the transformed time scale; calculating: a survival probability function for the vehicular component based on each transformed time scale, an average runtime of the vehicular component prior to failure, and an average runtime of the vehicular component prior to a scheduled replacement; calculating an economic criterion value for each given threshold value based on the above calculations and one or more economic parameters; generating the replacement policy to include (i) the lifetime wear indicator function that optimizes the economic criterion value and (ii) the corresponding threshold value.

20 Claims, 4 Drawing Sheets

(51) Int. Cl.
  *B60K 35/00* (2006.01)
  *G07C 5/08* (2006.01)
(58) Field of Classification Search
  USPC ............... 324/699, 451, 454, 750.3, 500,
       76.11,324/71.1, 200, 207.25, 207.13,
       207.2, 207.23; 702/184, 136, 1, 182–183;
              701/36, 146, 701/146.2, 146.3, 29
  See application file for complete search history.

(56) References Cited

U.S. PATENT DOCUMENTS

| | | | |
|---|---|---|---|
| 6,085,154 | A | 7/2000 | Leuthausser et al. |
| 6,330,499 | B1 | 12/2001 | Chou et al. |
| 6,424,930 | B1 | 7/2002 | Wood |
| 6,484,080 | B2 | 11/2002 | Breed |
| 6,748,305 | B1 | 6/2004 | Klausner et al. |
| 6,834,256 | B2 | 12/2004 | House |
| 7,103,460 | B1 | 9/2006 | Breed |
| 7,369,925 | B2 | 5/2008 | Morioka et al. |
| 7,383,165 | B2 | 6/2008 | Aragones |
| 7,418,321 | B2 | 8/2008 | Boutin |
| 7,428,541 | B2 | 9/2008 | Houle |
| 7,474,988 | B2 | 1/2009 | Kamisuwa et al. |
| 7,489,994 | B2 | 2/2009 | Isono et al. |
| 7,567,972 | B2 | 7/2009 | Geiselhart et al. |
| 7,920,944 | B2 | 4/2011 | Gould |
| 8,024,084 | B2 * | 9/2011 | Breed ............... B60C 23/0493 340/438 |
| 8,068,104 | B2 | 11/2011 | Rampersad |
| 8,131,420 | B2 | 3/2012 | Lynch et al. |
| 8,200,389 | B1 | 6/2012 | Thompson et al. |
| 8,224,765 | B2 | 7/2012 | Khalak et al. |
| 8,229,624 | B2 | 7/2012 | Breed |
| 8,229,900 | B2 | 7/2012 | Houle |
| 8,285,438 | B2 | 10/2012 | Mylaraswamy et al. |
| 8,311,858 | B2 | 11/2012 | Everett et al. |
| 8,359,134 | B2 | 1/2013 | Maesono |
| 8,374,745 | B2 | 2/2013 | Zhang et al. |
| 8,452,481 | B2 | 5/2013 | Ishiko et al. |
| 8,543,280 | B2 | 9/2013 | Ghimire |
| 8,548,671 | B2 | 10/2013 | Wong et al. |
| 8,626,385 | B2 | 1/2014 | Humphrey |
| 8,676,631 | B2 | 3/2014 | Basak |
| 2003/0095278 | A1 | 5/2003 | Schwartz et al. |
| 2003/0137194 | A1 | 7/2003 | White |
| 2005/0065678 | A1 | 3/2005 | Smith |
| 2008/0036487 | A1* | 2/2008 | Bradley ............ G01R 31/31708 324/750.3 |
| 2010/0198771 | A1 | 8/2010 | Khalak |
| 2010/0332201 | A1 | 12/2010 | Albarede et al. |
| 2011/0118905 | A1 | 5/2011 | Mylaraswamy |
| 2013/0035822 | A1 | 2/2013 | Singh et al. |
| 2014/0336869 | A1 | 11/2014 | Bou-Ghannam et al. |

FOREIGN PATENT DOCUMENTS

| | | |
|---|---|---|
| EP | 1110096 B1 | 6/2011 |
| EP | 2730448 A1 | 5/2014 |
| JP | 06331504 A | 12/1994 |
| JP | 07028523 A | 1/1995 |
| JP | 2008052660 A | 3/2008 |

OTHER PUBLICATIONS

IP.com, IBM, Wear-Leveling Technique for Eeprom devices, IPCOM000187712D, Sep. 2009.

Jardine et al. Optimizing a Mine Haul Truck Wheel Motors' Condition Monitoring Program: Use of Proportional Hazard Modeling, Case Study Report, Optimal Maintenance Decision Inc. 2001.

Tian et al. Condition Based Maintenance Optimization Considering Multiple Objectives, Journal of Intelligent Manufacturing 23, 2, 333-340. 2012.

J. Rust, Optimal Replacement of GMC Bus Engines: An Empirical Model of Harold Zurcher, Econometrica 55, 5, 999-1033. 1987.

Zhu et al. Intelligent Maintenance Support System for Syncrude Mining Trucks, 1993 Canadian Conference on Electrical and Computer Engineering, Vancouver, 1217-1220.

Lam et al. Optimal Maintenance—Policies for Deteriorating Systems under Various Maintenance Strategies, IEEE Transactions on Reliability 43, 3, 423-430. 1994.

Wu et al. A Neural Network Integrated Decision Support System for Condition-Based Optimal Predictive Maintenance Policy, IEEE Transactions on Systems, Man, and Cybernetics Part A: System and Humans, 37, 2, 226-236. 2007.

Murphy, Kevin P. Machine Learning: a Probabilistic Perspective, The MIT Press, 2012. Table of Contents. Year Year Year.

Wikipedia, Survival Analysis, Sep. 18, 2014, https://en.wikipedia.org/w/index.php?title=Survival_analysis&oldid=626053780.

Therneau, Terry. Extending the Cox Model, Technical Report No. 58, Nov. 1996.

Hastie et al. The Elements of Statistical Learning: Data Mining, Inference and Prediction, The Mathematical Intelligencer 27.2 (2005): 83-85.

Mannila et al. Discovery of Frequent Episodes in Event Sequences, Data Mining and Knowledge Discovery 1.3 (1997): 259-289.

Bair et al. Prediction by Supervised Principal Components, Journal of the American Statistical Association, 101(473). 2006.

Banjevic et al. A Control-Limit Policy and Software for Condition-Based Maintenance Optimization, INFOR-OTTAWA-, 39(1), 32-50. 2001.

Fox J. Cox Proportional-Hazards Regression for Survival Data, 2002.

Jardine et al. Repairable System Reliability: Recent Developments in CBM Optimization, International Journal of Performability Engineering, 4(3), 205. 2008.

Scholkopf et al. Learning with Kernels, MIT press Cambridge, 2002.

Wu et al. Optimal Replacement in the Proportional Hazards Model with Semi-Markovian Covariate Process and Continuous Monitoring, Reliability, IEEE Transactions on, 60(3),580-589. 2011.

Zaki, M.J. Spade, An Efficient Algorithm for Mining Frequent Sequences, Machine Learning, 42(1-2), 31-60.

Bachetti et al. Survival Trees with Time-Dependent Covariates: Application to Estimating Changes in the Incubation Period of AIDS, Lifetime Data Anal., vol. 1, No. 1, pp. 35-47, 1995.

Breiman et al. Classification and Regression Trees, 1st ed. Chapman and Hall/CRC, 1984.

Friedman et al. Additive Logistic Regression: a Statistical View of Boosting, (With Discussion and a Rejoinder by the Authors), Ann. Stat., vol. 28, No. 2, pp. 337-407, Apr. 2000.

Hothorn et al. Survival Ensembles, Biostat, vol. 7, No. 3, pp. 355-373, Jul. 2006.

Huang et al. Piecewise Exponential Survival Trees with Time-Dependent Covariates, Biometrics, vol. 54. No. 4, pp. 1420-1433, Dec. 1998.

Motorola Inc. et al. New Method and Apparatus for Device Failure Assessment, IPCOM000159857D, Oct. 2007.

IBM, Method of Component Failure Prediction in Large Server and Storage Systems, Jan. 13, IPCOM000191729D, 2010.

An et al. Fatigue Life Prediction Based on Bayesian Approach to Incorporate Field Data into Probability Model, Structural Engineering and Mechanics, vol. 37, No. 4, p. 427-442, 2011.

Jardine et al. A Review on Machinery Diagnostics and Prognostics Implementing Condition-Based Maintenance, in: Mechanical Systems and Signal Processing, 20, 2006, pp. 1483-1510.

Peng et al. Current Status of Machine Prognostics in Condition-Based Maintenance: a Review, in: International Journal of Advanced Manufacturing Technology, 50, 2010, pp. 297-313.

Lin et al. Filters and Parameter Estimation for a Partially Observable System Subject to Random Failure with Continuous-Range Observations, in: Advances in Applied Probability, 36(4), 2004, pp. 1212-1230.

Lin et al. On-Line Parameter Estimation for a Failure-Prone System Subject to Condition Monitoring, in: Journal of Applied Probability, 41(1), 2004, pp. 211-220.

(56) References Cited

OTHER PUBLICATIONS

S. Mussi, General Environment for Probabilistic Predictive Monitoring, International Journal of Computers vol. 7, No. 2, 31-49. 2013.

S. Mussi, Probabilistic Predictive Monitoring with CHEERUP, International Journal of Computers vol. 6, No. 1, 93-102. 2012.

Liao et al. Predictive Monitoring and Failure Prevention of Vehicle Electronic Components and Sensor Systems, SAE Technical Paper 2006-1-0373, 2006, doi:10.4271/2006-01-0373. 2006.

Jardine et al. Repairable System Reliability: Recent Developments in CBM Optimization, 19th International Congress and Exhibition on Condition Monitoring and Diagnostic Engineering Management (COMADEM). Lulea, Sweden, Jun. 2006.

Ataman et al. Knowledge Discovery in Mining Truck Databases, Proceedings. 17th International Mining Congress, The Chamber of Mining Engineers of Turkey, Ankara, 2001.

Hu et al. Early Detection of Mining Truck Failure by Modeling its Operation with Neural Networks Classification Algorithms, Application of Computers and Operations Research in the Minerals Industries, South African Institute of Mining and Metallurgy, 2003.

Ahmad et al. An Overview of Time-Based and Condition-Based Maintenance in Industrial Application, Computers and Industrial Engineering 63, 1, 135-149. 2012.

Jardine et al., "Optimal replacement policy and the structure of software for condition-based maintenance," Journal of Quality in Maintenance Engineering 3, 2, 109-119. 1997.

Jardine et al., Maintenance, replacement, and reliability: theory and applications. CRC Press LLC, 2013.

Zhang, An Introduction to Support Vector Machines and Other Kernel-Based Learning Methods—A Review. AI Magazine vol. 22 No. 2 (2001).

Singer et al., Applied longitudinal data analysis: Modeling change and event occurrence. http://gseacademic.harvard.edu/alda/. Jun. 1, 2005.

Lin et al., "Using principal components in a proportional hazards model with applications in condition-based maintenance," Journal of Operational Research Society 57, 910-919. 2006.

List of IBM Patents or Applications Treated as Related.

\* cited by examiner

INTEGRATING ECONOMIC CONSIDERATIONS TO DEVELOP A COMPONENT REPLACEMENT POLICY BASED ON A CUMULATIVE WEAR-BASED INDICATOR FOR A VEHICULAR COMPONENT

FIELD OF THE INVENTION

Embodiments of the invention generally relate to information technology, and, more particularly, to vehicle monitoring and management.

BACKGROUND

Challenges in asset-intensive industries include maintaining availability of physical assets such as, for example, vehicles, while keeping maintenance costs low. Most vehicular equipment vendors publish a maintenance schedule based on a static pre-established standard working environment, which may not apply to a particular vehicle owner and/or user. Consequently, such an approach commonly does not result in satisfactory performance as measured according to a given user's objectives.

Accordingly, a need exists for techniques for monitoring vehicles utilizing different sources of data to optimize the tradeoff between scheduled replacement costs and unscheduled breakdown costs.

SUMMARY

In one aspect of the present invention, techniques for integrating economic considerations to develop a component replacement policy relying on a cumulative wear-based indicator for a vehicular component are provided. A first example computer-implemented method can include, for each of multiple lifetime wear indicator functions associated with a vehicular component, wherein each lifetime wear indicator function comprises a transformed time scale plotting wear indicator values over a period of time, determining multiple corresponding candidate threshold values on the transformed time scale. Additionally, the method includes calculating, for each of the multiple lifetime wear indicator functions: (i) a survival probability function for the vehicular component based on the transformed time scale of each of the multiple lifetime wear indicator functions; (ii) an average runtime of the vehicular component prior to failure for each instance wherein the vehicular component failed prior to the corresponding given threshold value; and (ii) an average runtime of the vehicular component prior to a scheduled replacement for each instance wherein the vehicular component reached the corresponding given threshold value. The method further includes calculating, for each of the multiple lifetime wear indicator functions, an economic criterion value for the corresponding given threshold value based on (i) the survival probability function, (ii) the average runtime of the vehicular component prior to failure, (iii) the average runtime of the vehicular component prior to a scheduled replacement, and (iv) one or more economic parameters. Additionally, the method includes comparing the multiple lifetime wear indicator functions for the vehicular component at the corresponding given threshold value to identify one of the multiple lifetime wear indicator functions that optimizes the economic criterion value; and generating a replacement policy for the vehicular component, wherein said replacement policy comprises (i) the identified lifetime wear indicator function and (ii) the given threshold value corresponding to the identified lifetime wear indicator function.

In another aspect of the invention, a second example computer-implemented method can include, for each of multiple lifetime wear indicator functions associated with a vehicular component, wherein each lifetime wear indicator function comprises a transformed time scale plotting wear indicator values over a period of time, determining multiple corresponding candidate threshold values on the transformed time scale. Additionally, the method includes calculating, for each of the multiple lifetime wear indicator functions at each of the multiple corresponding candidate threshold values: (i) a survival probability function for the vehicular component based on the transformed time scale of each of the multiple lifetime wear indicator functions; (ii) an average runtime of the vehicular component prior to failure for each instance wherein the vehicular component failed prior to the corresponding candidate threshold value; and (iii) an average runtime of the vehicular component prior to a scheduled replacement for each instance wherein the vehicular component reached the corresponding candidate threshold value. The method also includes calculating, for each of the multiple lifetime wear indicator functions, an economic criterion value for each of the multiple corresponding candidate threshold values based on (i) the survival probability function, (ii) the average runtime of the vehicular component prior to failure, (iii) the average runtime of the vehicular component prior to a scheduled replacement, and (iv) one or more economic parameters. Further, the method includes comparing, for each of the multiple lifetime wear indicator functions for the vehicular component, the economic criterion value for each of the multiple candidate threshold values to identify one of the multiple candidate threshold values that optimizes the economic criterion value for the corresponding lifetime wear indicator function. Also, the method includes comparing the multiple lifetime wear indicator functions for the vehicular component at the candidate threshold value that optimizes the economic criterion value for the corresponding lifetime wear indicator function to identify one of the multiple lifetime wear indicator functions that optimizes the economic criterion value. Additionally, the method includes generating a replacement policy for the vehicular component, wherein said replacement policy comprises (i) the identified lifetime wear indicator function and (ii) the threshold value that optimizes the economic criterion value for the corresponding lifetime wear indicator function.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes integrating economic considerations to develop an optimized component replacement policy relying on a cumulative wear-based indicator for a vehicular component. At least one embodiment of the invention includes obtaining and/or receiving, as input, (i) a set of input time series, each of which represents a history of lifetime wear indicator functions and cumulative runtime (for example, in hours) for a vehicular component; and (ii) multiple economic parameters for profit and/or cost optimization, wherein the economic parameters can include scheduled and unscheduled component repair costs, as well as variable costs per unit runtime (for example, fuel cost per unit runtime, and/or revenue per unit runtime). Based on such input, at least one embodiment of the invention includes generating a component replacement policy for a vehicular component that includes a lifetime wear indicator function and a corresponding threshold value for indicating a time to replace the component.

Figure 1:
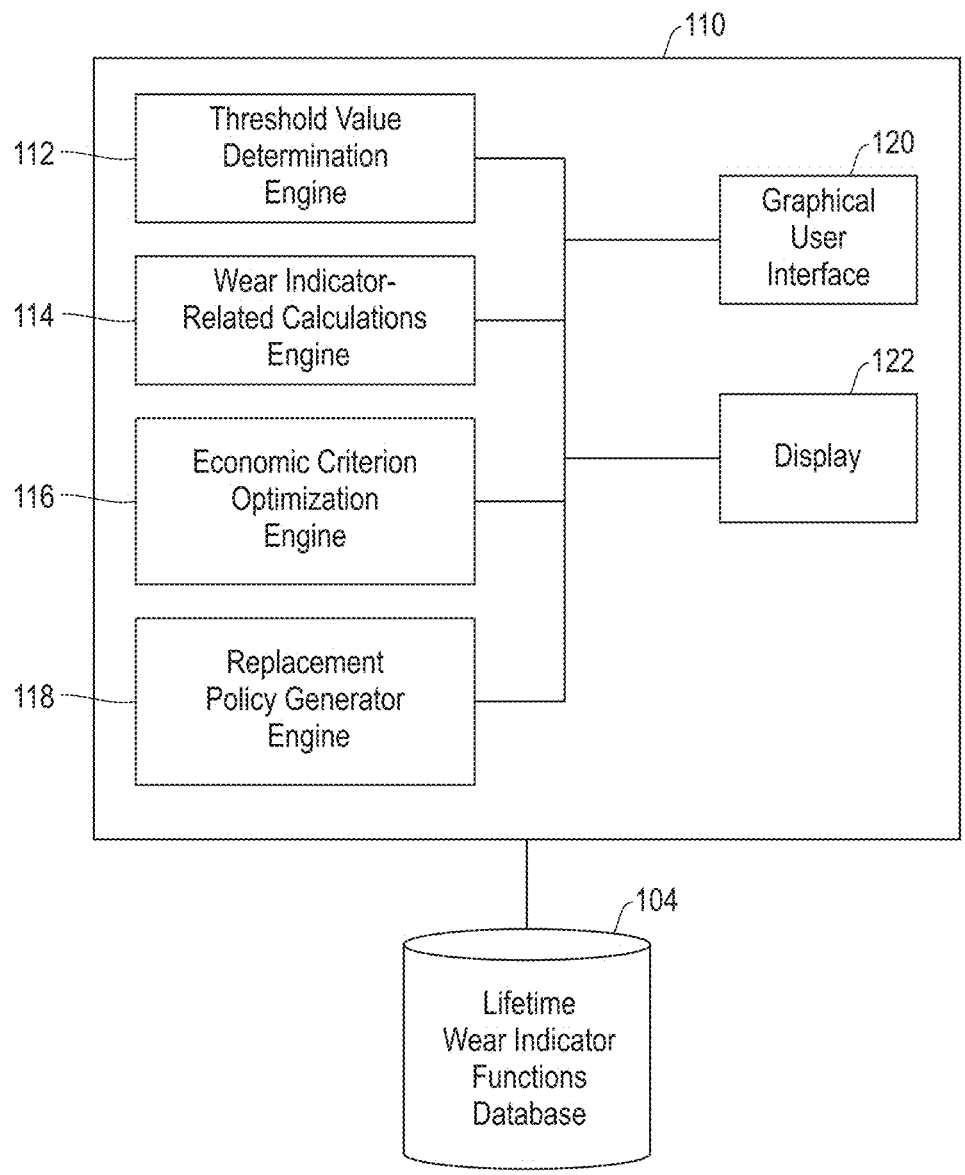
FIG. 1 is a diagram illustrating system architecture, according to an example embodiment of the invention.

FIG. 1 is a diagram illustrating system architecture, according to an example embodiment of the present invention. By way of illustration, FIG. 1 depicts a replacement policy generation system 110, which receives input from a lifetime wear indicator functions database 106, as further described herein. Additionally, the replacement policy generation system 110 includes a threshold value determination engine 112, a wear indicator-related calculations engine 114, an economic criterion optimization engine 116, a replacement policy generator engine 118, a graphical user interface 120 and a display 122. As further detailed herein, engines 112, 114, 116 and 118 process multiple forms of data to generate a replacement policy for one or more vehicular components based on the input provided by lifetime wear indicator functions database 106. The generated replacement policy for the vehicular components are then transmitted to the graphical user interface 120 and the display 122 for presentation and/or potential manipulation by a user.

As noted above, in existing component management approaches, replacement policies are commonly based on a runtime hours-based fixed time interval that can be, for example, recommended by the manufacturer of the given component based on usage in a pre-established context assumed by the manufacturer.

In contrast, given a cumulative wear indicator function (which is monotonically increasing over the runtime of a vehicular component), at least one embodiment of the invention includes performing a task to obtain an optimal threshold value for the replacement policy in terms of a given economic criterion (such as, for example, average maintenance cost per unit runtime). Generating a cumulative wear indicator function can be carried out via techniques such as taught, for example, in the U.S. patent application entitled "Generating Cumulative Wear-Based Indicators for Vehicular Components," filed concurrently herewith and incorporated by reference herein in its entirety. Note that in a threshold-based replacement policy, a component should be replaced when the cumulative wear-based indicator value reaches a given threshold value. Also, at least one embodiment of the invention includes comparing multiple cumulative wear indicator functions in terms of the given economic criterion at the determined threshold value. Based on the comparison, such an embodiment further includes selecting the best lifetime wear indicator function and its corresponding optimal threshold value.

Accordingly, generating a runtime-based replacement policy for a component type can include the following. Given a list of previously-replaced vehicular components (both due to failure and scheduled replacements) and current and/or active vehicular components for a given component type over a group of equipment (such as, for example, a list of previously-replaced engines and current and/or active engines (that have not been replaced) in a fleet of vehicles operated by a given enterprise), as well as the corresponding time-stamped logs of runtime hours for all such components, let $F(t)=Pr(T \leq t)$ be the cumulative failure probability function at runtime t (that is, the probability that the component would fail by a given time t), wherein T is a random variable denoting the runtime at failure, and let $S(t)=1-F(t)$ be the survival probability function at t (that is, the probability that the component would survive (not fail) up to a given time t). In at least one embodiment of the invention, the survival probability function can be estimated using a parametric Weibull fit to the runtime and failure data (wherein such techniques would be appreciated by one skilled in the art).

Also, at least one embodiment of the invention includes utilization and/or implementation of economic and logistic parameters that include the following:

$C_f$=in-field failure replacement cost, which includes the cost of the replacement component, the cost of the labor to replace the component, the retrieval cost of related equipment from the field, and lost revenue due to the preclusion of operation for other equipment due to the failure of the given component (also referred to as a "circuit break");

$C_p$=scheduled replacement cost, which includes the cost of the replacement component and the cost of the labor to replace the component;

$c_d$=cost per unit downtime of the component, which includes lost revenue that could have been contributed by that component were the component not out of operation;

$DT_f$=component downtime due to an in-field failure; and $DT_p$=component downtime due to a scheduled replacement.

In-field failure replacement costs and downtime values are commonly greater than scheduled replacement costs and downtime values, respectively ($C_f > C_p$, $DT_f > DT_p$).

At least one embodiment of the invention additionally includes denoting the scheduled replacement time for the policy as $t_p$, which also represents the optimization target. Given a scheduled replacement policy, the mean time to failure replacement that occurs prior to $t_p$ is denoted by $t_f$ and estimated as:

$$t_f = \frac{1}{F(t_p)} \int_0^{t_p} t f(t) \, dt = t_p - \frac{\int_0^{t_p} F(t) \, dt}{F(t_p)}.$$

A new component lifetime cycle starts at the installation time of a given component, and a component replacement due to an in-field failure or a scheduled replacement finishes the component's lifetime cycle. For a runtime-based replacement policy, at least one embodiment of the invention includes selecting $t_p$ to minimize the average maintenance cost per unit runtime. In such an embodiment, the following calculations can be carried out:

average total time per cycle = $(t_f + DT_f)F(t_p) + (t_p + DT_p)(1 - F(t_p))$;

average runtime per cycle = $t_f F(t_p) + t_p(1 - F(t_p))$;

and average maintenance cost per unit runtime =

$$\frac{\text{average maintenance cost per cycle}}{\text{average runtime per cycle}} =$$

$$\frac{(\text{average failure replacement cost per cycle} + \text{average scheduled replacement cost per cycle})}{\text{average runtime per cycle}} =$$

$$\frac{(C_f + c_d DT_f)F(t_p) + (C_p + c_d DT_p)(1 - F(t_p))}{t_f F(t_p) + t_p(1 - F(t_p))} =$$

$$(C_f - C_p + c_d(DT_f - DT_p))\frac{F(t_p)}{X} + (C_p + c_d DT_p)\frac{1}{X},$$

wherein $X$ = average runtime per cycle = $t_f F(t_p) + t_p(1 - F(t_p))$.

Figure 2:
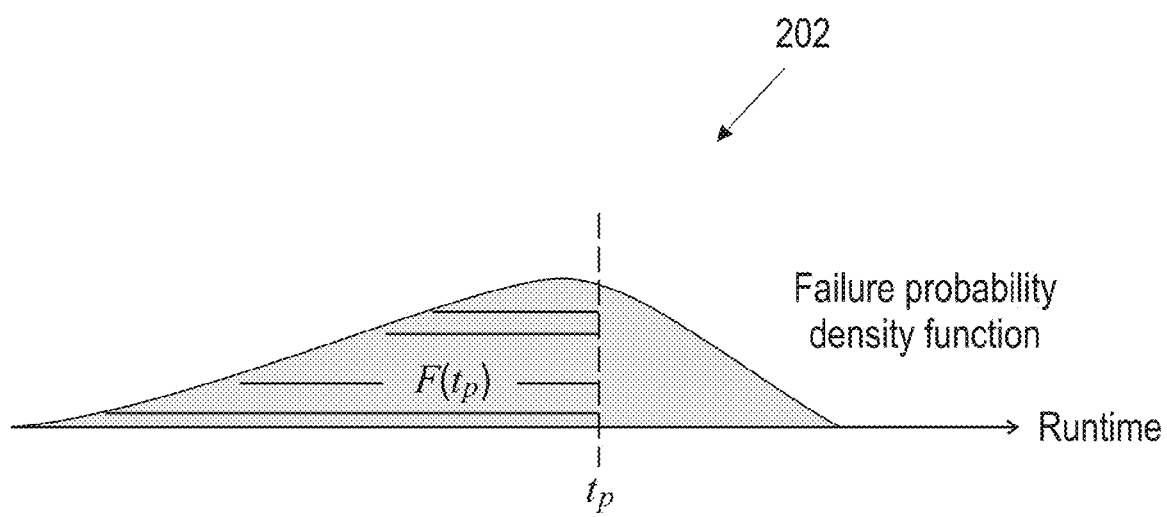
FIG. 2 is a diagram illustrating the trade-off between the average runtime per cycle and the total in-field failure probability, according to an example embodiment of the present invention.

Accordingly, as $t_p$ (that is, the scheduled replacement time) is set to a higher value, there is an increased chance of in-field failure replacements; that is, $F(t_p)$ (the total probability of in-field failure replacements) becomes larger, as illustrated in FIG. 2. As such, FIG. 2 is a diagram 202 illustrating the trade-off between the average runtime per cycle and the total in-field failure probability ($F(t_p)$), according to an example embodiment of the present invention.

Because, in general, $DT_f > DT_p$ and $C_f > C_p$, the optimization goal of minimizing the average maintenance cost per unit runtime can be achieved by increasing the average runtime per cycle (that is, $X = t_f F(t_p) + t_p(1 - F(t_p))$) and decreasing the in-field failure probability per cycle ($F(t_p)$). Note, as depicted in FIG. 2, that there is a trade-off between decreasing $F(t_p)$ and increasing the average runtime per cycle. For example, decreasing $F(t_p)$ to involve fewer failure replacements can be obtained by decreasing $t_p$, but this then reduces the average runtime per cycle. Note also that, in general, $t_f < t_p$.

Accordingly, in at least one embodiment of the invention, given $F(t)$, $C_f$, $C_p$, $C_d$, $DT_f$ and $DT_p$, the average maintenance cost per unit runtime is a function of $t_p$, which is denoted as g as follows:

$$g(t_p) = \frac{(C_f + c_d DT_f)F(t_p) + (C_p + c_d DT_p)(1 - F(t_p))}{t_f F(t_p) + t_p(1 - F(t_p))}.$$

Additionally, note that in one or more embodiments of the invention, the cumulative failure probability function ($F(t)$) is fixed and can be estimated using the failure data for the given component type under analysis. Note also that $t_f$ depends on $F(t)$. Consequently, the optimized time threshold for the scheduled replacement policy can be determined as follows:

$$t_p^* = \arg\max_{t_p} g(t_p).$$

As detailed herein, at least one embodiment of the invention also includes determining a cumulative wear-based replacement policy for a component type. Given a list of previously-replaced components (due to a failure or a scheduled replacement) and current and/or active components (that have not been replaced) for a given component type over a group of equipment or machinery, as well as the corresponding time-stamped logs of runtime hours for all such components and a cumulative wear-based indicator function for the component, let v be a wear indicator value. Also, let $\hat{F}(v) = Pr(V \leq v)$ be the cumulative failure probability function at wear indicator value v, wherein v is a random variable denoting the wear indicator at failure, and let $\hat{S}(v) = 1 - \hat{F}(v)$ be the survival probability function at v. For example, in one or more embodiments of the invention, the survival probability function can be estimated by a local regression on the Kaplan-Meir (KM) estimate using the wear indicator and failure data.

Denoted by $v_p$, the wear indicator threshold value for scheduled replacements for the wear indicator-based scheduled replacement policy is an optimization target of at least one embodiment of the invention. Additionally, $\hat{F}(v_p)$ represents the total expected probability of failure replacements, and $1 - \hat{F}(v_p)$ represents the total expected probability of scheduled replacements. With this scheduled replacement policy, the expected time to a scheduled replacement at $v_p$ is denoted by $\hat{t}_p$. Also, the expected time to a failure replacement is denoted by $\hat{t}_f$, and in one or more embodiments of the invention, $\hat{t}_p$ and $\hat{t}_f$ are estimated under one or more assumptions. Example assumptions are detailed and implemented below.

Let Comp$[v \geq v_p]$ denote the set of all components whose wear indicator value reaches $v_p$ in the dataset, whereas Comp$[v < v_p]$ denotes the set of all components whose wear indicator value is $v < v_p$ for all time t in the dataset.

Let P$[v \geq v_p]$ denote the ratio of the actual number of components in Comp$[v \geq v_p]$ to the total number of components in the dataset. The ratio P$[v \geq v_p]$ is equal to or less than $1 - \hat{F}(v_p)$ (that is, the total expected probability of scheduled replacement) because the total expected probability takes right-censored components (that is, components that are running at the time of data collection) into account. There are running components that would fail with $v > v_p$. Additionally, it is assumed that those components contribute to scheduled replacements corresponding to the difference between the expected probability and the above-noted ratio (that is, $1 - \hat{F}(v_p) - P[v \geq v_p]$), and that such components are schedule-replaced at $v_p$ with the cumulative probability function of the replacement time, $\hat{F}_{v < v_p}(t) = 1 - \hat{S}_{v < v_p}$, wherein $\hat{S}_{v < v_p}(t)$ is the survival probability function estimated using a Weibull fit to the runtime and failure data of Comp$[v < v_p]$. In other words, it is assumed that $\hat{F}_{v < v_p}(t)$, estimated using Comp$[v < v_p]$, is uniformly applied to all data in the range of $v < v_p$. Thus, the mean scheduled replacement time over those components corresponding to $1 - \hat{F}(v_p) - P[v \geq v_p]$ is the same as the mean failure time over Comp$[v < v_p]$, which is denoted by r and estimated as $r = \int_0^\infty \hat{S}_{v < v_p}(t) dt$. Accordingly, $\hat{t}_f$ = expected time to failure replacement = $\int_0^\infty \hat{S}_{v < v_p}(t) dt$. Also, $\hat{t}_p$=expected time to scheduled replacement={P[v≥$v_p$]E[t|v=$v_p$ for Comp[v≥$v_p$]]+(1−$\hat{F}(v_p)$−P[v≥$v_p$]) r}/(1−$\hat{F}(v_p)$)).

Note also that, in one or more embodiments of the invention, E[t|v=$v_p$ for Comp[v≥$v_p$]] is the average of scheduled replacement times at v=$v_p$ over Comp[v≥$v_p$].

Alternatively, in at least one embodiment of the invention, it is assumed that components in Comp[$v_p$] that would fail after $t_c$ contribute to scheduled replacements for the difference (that is, 1−$\hat{F}(v_p)$−P[v≥$v_p$]), whereas components in Comp[v<$v_p$] that would fail before $t_c$ are failure-replaced. Also, estimate $t_c$ can be estimated from the constraint $\hat{F}(v_p)=\hat{F}_{v<v_p}(t_c)$ (1−P[v≥$v_p$]); that is, the total expected probability of failure replacements over all components ($\hat{F}(v_p)$) should be the same as the ratio of the actual number of components in Comp[v<$v_p$] to the number of total components in the dataset (1−P[v≥$v_p$]) multiplied by the total expected probability of failure replacements before $t_c$ over Comp[v<$v_p$] (that is, $\hat{F}_{v<v_p}(t_c)$).

Accordingly, $$\hat{t}_f = \text{expected time to failure replacement} = t_c - \frac{\int_0^{t_c} \hat{F}_{v<v_p}(t)\,dt}{\hat{F}_{v<v_p}(t_c)}.$$

Additionally, the mean scheduled replacement time over those components corresponding to 1−$\hat{F}(v_p)$−P[v≥$v_p$] is denoted by r and estimated as: r={$\int_0^\infty \hat{S}_{v<v_p}(t)dt - \hat{t}_f\hat{F}_{v<v_p}(t_c)$}/(1−$\hat{F}_{v<v_p}(t_c)$). Further, $\hat{t}_p$=expected time to scheduled replacement={(P[v≥$v_p$]E[t|v=$v_p$ for Comp[v≥$v_p$]]+(1−$\hat{F}(v_p)$−P[v≥$v_p$])r}/(1−$\hat{F}(v_p)$)).

For the wear indicator-based replacement policy, at least one embodiment of the invention includes selecting $v_p$ to minimize the average maintenance cost per unit runtime. Accordingly, average maintenance cost per unit runtime =

$$\frac{\text{average maintenance cost per cycle}}{\text{average runtime per cycle}} =$$

$$\frac{(C_f + c_d DT_f)\hat{F}(v_p) + (C_p + c_d DT_p)(1 - \hat{F}(v_p))}{\hat{t}_f \hat{F}(v_p) + \hat{t}_p(1 - \hat{F}(v_p))} =$$

$$(C_f - C_p + c_d(DT_f - DT_p))\frac{\hat{F}(v_p)}{\hat{X}} + (C_p + c_d DT_p)\frac{1}{\hat{X}},$$

wherein $\hat{X}$=average runtime per cycle=$\hat{t}_f\hat{F}(v_p)+\hat{t}_p(1-\hat{F}(v_p))$.

As in the analysis of the runtime-based policy, an optimization goal of minimizing the average maintenance cost per unit work can be achieved by increasing the average runtime per cycle (that is, $\hat{t}_f\hat{F}(v_p)+\hat{t}_p(1-\hat{F}(v_p))$) and decreasing the in-field failure probability per cycle $\hat{F}(v_p)$. However, in contrast to the runtime-based policy, with wear indicator functions steeply increasing around $v_p$, there is no strong trade-off between decreasing $\hat{F}(v_p)$ and increasing the average runtime per cycle. In other words, decreasing $\hat{F}(v_p)$ to involve fewer failure replacements can be obtained by decreasing $v_p$, but this does not necessarily lead to a large decrease of $\hat{t}_p$ (that is, the average of scheduled replacement times at $v_p$) when the wear indicator functions are steeply increasing around $v_p$ (compared with slowly increasing shaped functions).

Further, considering the definitions of $\hat{t}_p$ (involving the term [t|v=$v_p$ for Comp[v≥$v_p$]]) and $\hat{t}_f$ (involving $\hat{S}_{v<v_p}(t)$ or $\hat{F}_{v<v_p}(t)$), if decreasing $v_p$ would allow failures that occur later in time to be schedule-replaced, this would tend to increase both $\hat{t}_p$ and $\hat{t}_f$ as well as decreasing $\hat{F}(v_p)$. Also, if decreasing $v_p$ would allow failures that happen earlier in time to be schedule-replaced, this would tend to decrease $\hat{t}_p$ but still tend to increase $\hat{t}_f$ and decrease $\hat{F}(v_p)$. Note also that in contrast to the runtime-based policy, $\hat{t}_f$ is not necessarily smaller than $\hat{t}_p$ for a wear indicator-based policy. That is, decreasing $\hat{t}_p$ does not lead to decreasing $\hat{t}_f$. The values of $\hat{t}_p$ and $\hat{t}_f$ at the optimization of $v_p$ rely on the complete distribution and paths in the runtime versus a wear indicator two-dimensional plot. By way of example, one or more embodiments of the invention include an assumption that a two-dimensional plot including an x-axis of runtime and a y-axis of wear indicator values is given by implementing techniques such as taught, for example, in the U.S. patent application entitled "Generating Cumulative Wear-Based Indicators for Vehicular Components," filed concurrently herewith and incorporated by reference herein in its entirety.

Given $C_f$, $C_p$, $c_d$, $DT_f$, $DT_p$, $\hat{F}(v')$, $\hat{t}_p(v')$ and $\hat{t}_f(v')$ for a designed wear indicator, the average maintenance cost per unit runtime is a function of $v_p$, which is denoted as $\hat{g}$, and calculated as follows:

$$\hat{g}(v_p \mid \hat{F}(v'), \hat{t}_p(v'), \hat{t}_f(v')) = \frac{(C_f + c_d DT_f)\hat{F}(v_p) + (C_p + c_d DT_p)(1 - \hat{F}(v_p))}{\hat{t}_f(v_p)\hat{F}(v_p) + \hat{t}_p(v_p)(1 - \hat{F}(v_p))}.$$

Accordingly, the value of $\hat{g}$ at $v_p$ is determined by the design of the wear indicator, which is what the paths of the wear indicator look like over time. As noted above, in one or more embodiments of the invention, the two-dimensional plot including an x-axis of runtime and a y-axis of wear indicator values is given, and it is assumed that a wear indicator function (or curve over runtime) for each component is also given. Subsequently, the optimized wear indicator threshold value for the scheduled replacement policy using this wear indicator can be represented as $$v_p^* = \arg\max_{v_p} \hat{g}(v_p \mid \hat{F}(v'), \hat{t}_p(v'), \hat{t}_f(v')).$$

Additionally, the runtime-based component replacement policy is compared with the new designed wear indicator-based replacement policy in terms of the average maintenance cost per unit runtime. That is, at least one embodiment of the invention includes comparing $g(t_p^*)$ with $\hat{g}(v_p^*|\hat{F}(v')$, $\hat{t}_p(v')$, $\hat{t}_f(v'))$. If $\hat{g}(v_p^*|\hat{F}(v')$, $\hat{t}_p(v')$, $\hat{t}_f(v'))$ is greater than $g(t_p^*)$, the designed wear indicator based replacement policy is more beneficial in terms of the given economic criterion.

Figure 3:
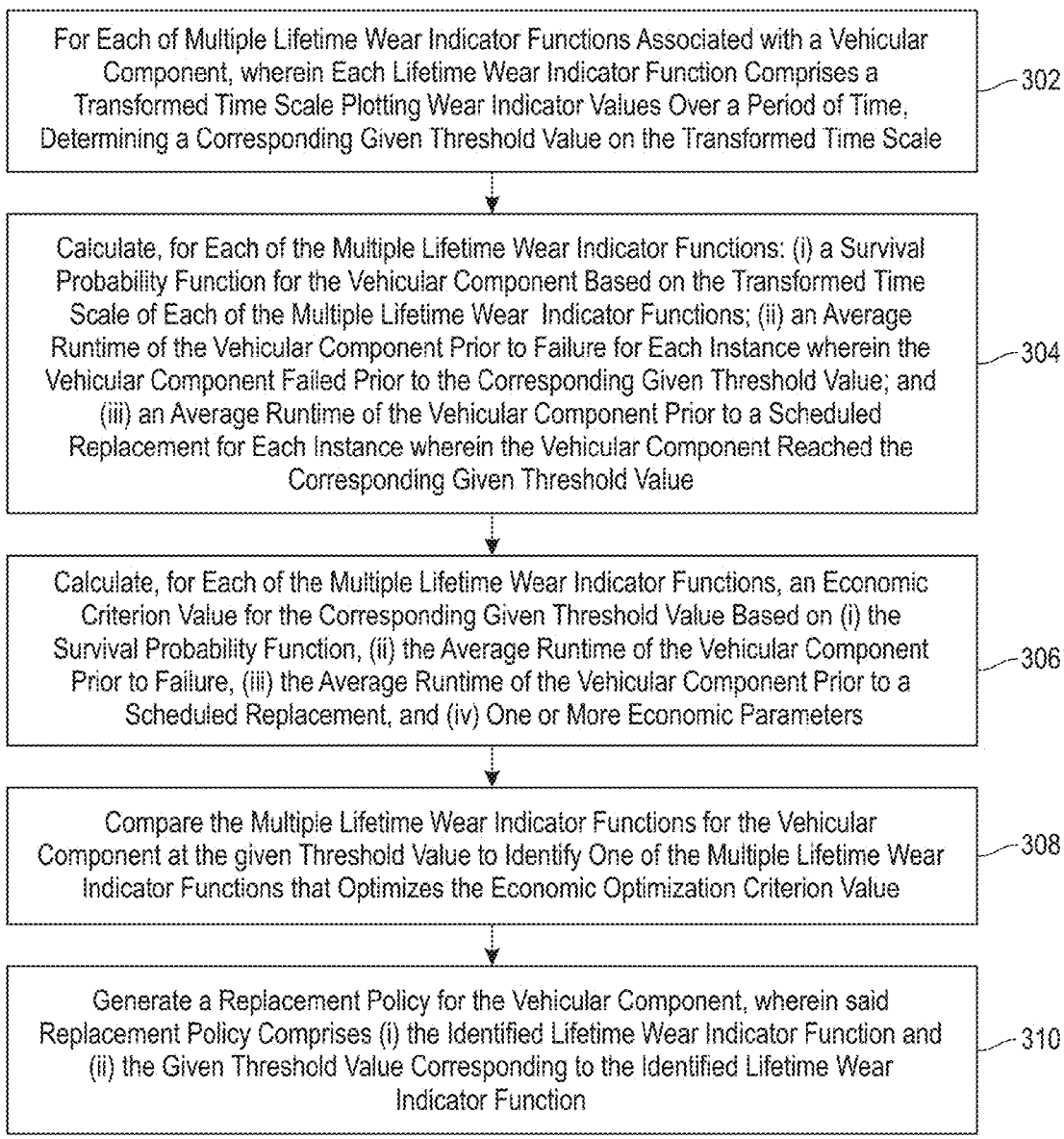
FIG. 3 is a flow diagram illustrating techniques according to an embodiment of the invention.

FIG. 3 is a flow diagram illustrating techniques according to an embodiment of the present invention. Step 302 includes: for each of multiple lifetime wear indicator functions associated with a vehicular component, wherein each lifetime wear indicator function comprises a transformed time scale plotting wear indicator values over a period of time, determining a corresponding given threshold value on the transformed time scale. Such a determination can include, for example, implementing a grid search or a random search of the obtained set of input time series, which can further include selecting the given threshold value from multiple candidate threshold values derived from the grid search or random search for the transformed time scale of each of the multiple lifetime wear indicator functions based on the economic criterion.

Step 304 includes calculating, for each of the multiple lifetime wear indicator functions: (i) a survival probability function for the vehicular component based on the transformed time scale of each of the multiple lifetime wear indicator functions; (ii) an average runtime of the vehicular component prior to failure for each instance wherein the vehicular component failed prior to the corresponding given threshold value; and (iii) an average runtime of the vehicular component prior to a scheduled replacement for each instance wherein the vehicular component reached the corresponding given threshold value.

Step 306 includes calculating, for each of the multiple lifetime wear indicator functions, an economic criterion value for the corresponding given threshold value based on (i) the survival probability function, (ii) the average runtime of the vehicular component prior to failure, (iii) the average runtime of the vehicular component prior to a scheduled replacement, and (iv) one or more economic parameters. The economic criterion can include, for example, average maintenance cost per unit runtime and/or average maintenance cost per unit work. Additionally, the economic parameters can include, for example, scheduled component repair costs, unscheduled component repair costs, and/or a variable cost per unit runtime (such as, for example, a fuel cost per unit runtime).

Step 308 includes comparing the multiple lifetime wear indicator functions for the vehicular component at the corresponding given threshold value to identify one of the multiple lifetime wear indicator functions that optimizes the economic criterion value. Step 310 includes generating a replacement policy for the vehicular component, wherein said replacement policy comprises (i) the identified lifetime wear indicator function and (ii) the given threshold value corresponding to the identified lifetime wear indicator function.

The techniques depicted in FIG. 3 can additionally include obtaining a set of input time series pertaining to the vehicular component, wherein each input time series includes a collection of values calculated from the multiple lifetime wear indicator functions for the vehicular component.

Also, at least one embodiment of the invention includes steps similar to those depicted in FIG. 3 but with one or more modifications and/or alternatives. For instance, such an embodiment includes, for each of the multiple lifetime wear indicator functions, each represented as a transformed time scale plotting wear indicator values over a period of time, determining multiple corresponding candidate threshold values on the transformed time scale. Additionally, such an embodiments includes calculating, for each of the multiple lifetime wear indicator functions at each of the multiple corresponding candidate threshold values: (i) a survival probability function for the vehicular component based on the transformed time scale of each of the multiple lifetime wear indicator functions; (ii) an average runtime of the vehicular component prior to failure for each instance wherein the vehicular component failed prior to the corresponding candidate threshold value; and (iii) an average runtime of the vehicular component prior to a scheduled replacement for each instance wherein the vehicular component reached the corresponding candidate threshold value.

Further, such an embodiment includes calculating, for each of the multiple lifetime wear indicator functions, an economic criterion value for each of the multiple corresponding candidate threshold values based on (i) the survival probability function, (ii) the average runtime of the vehicular component prior to failure, (iii) the average runtime of the vehicular component prior to a scheduled replacement, and (iv) one or more economic parameters. Such an embodiment also includes comparing, for each of the multiple lifetime wear indicator functions for the vehicular component, the economic criterion value for each of the multiple candidate threshold values to identify one of the multiple candidate threshold values that optimizes the economic criterion value for the corresponding lifetime wear indicator function. Further, such an embodiment includes comparing the multiple lifetime wear indicator functions for the vehicular component at the candidate threshold value that optimizes the economic criterion value for the corresponding lifetime wear indicator function to identify one of the multiple lifetime wear indicator functions that optimizes the economic criterion value. Accordingly, such an embodiment includes generating a replacement policy for the vehicular component, wherein said replacement policy comprises (i) the identified lifetime wear indicator function and (ii) the threshold value that optimizes the economic criterion value for the corresponding lifetime wear indicator function.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
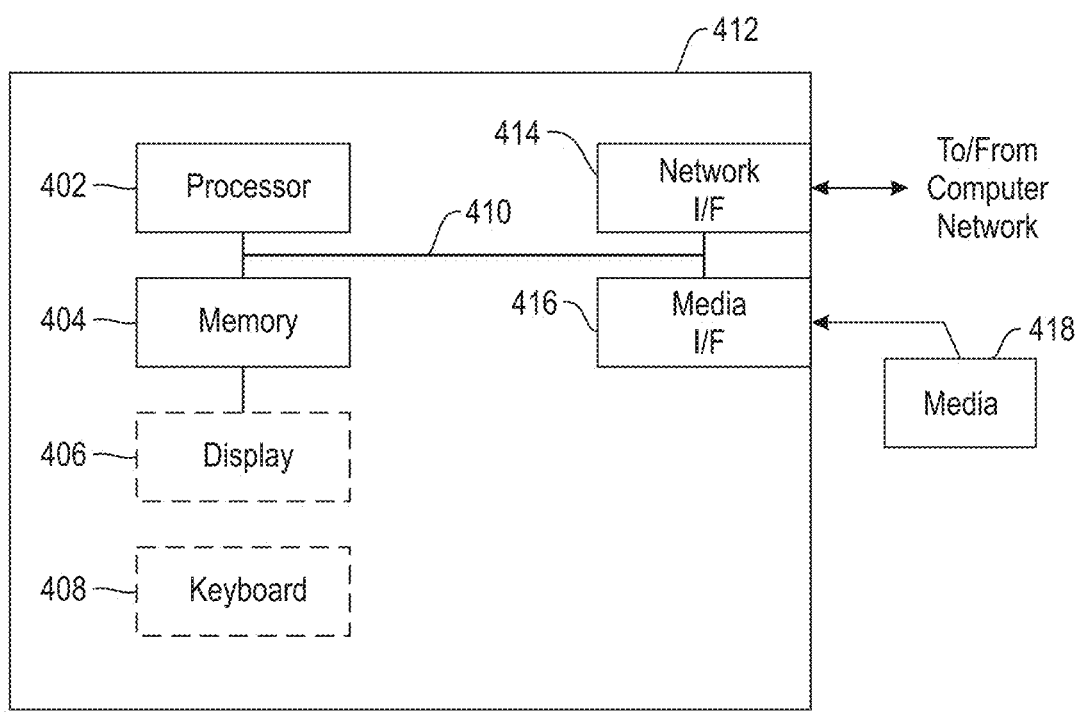
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, generating a component replacement policy relying on a cumulative wear-based indicator for a vehicular component.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the following steps:

for each of multiple lifetime wear indicator functions associated with a vehicular component, wherein each lifetime wear indicator function comprises a transformed time scale plotting wear indicator values over a period of time, determining a corresponding given threshold value on the transformed time scale;

calculating, for each of the multiple lifetime wear indicator functions:

a survival probability function for the vehicular component based on the transformed time scale of each of the multiple lifetime wear indicator functions;

an average runtime of the vehicular component prior to failure for each instance wherein the vehicular component failed prior to the corresponding given threshold value; and an average runtime of the vehicular component prior to a scheduled replacement for each instance wherein the vehicular component reached the corresponding given threshold value;

calculating, for each of the multiple lifetime wear indicator functions, an economic criterion value for the corresponding given threshold value based on (i) the survival probability function, (ii) the average runtime of the vehicular component prior to failure, (iii) the average runtime of the vehicular component prior to a scheduled replacement, and (iv) one or more economic parameters;

comparing the multiple lifetime wear indicator functions for the vehicular component at the corresponding given threshold value to identify one of the multiple lifetime wear indicator functions that optimizes the economic criterion value; and generating a replacement policy for the vehicular component, wherein said replacement policy comprises (i) the identified lifetime wear indicator function and (ii) the given threshold value corresponding to the identified lifetime wear indicator function;

wherein at least one of the steps is carried out by a computing device.

2. The method of claim 1, comprising:

obtaining a set of input time series pertaining to the vehicular component, wherein each input time series comprises a collection of values calculated from the multiple lifetime wear indicator functions for the vehicular component.

3. The method of claim 2, wherein said determining the given threshold value comprises implementing a grid search of the obtained set of input time series.

4. The method of claim 3, wherein said determining the given threshold value comprises selecting the given threshold value from multiple threshold values derived from the grid search for the transformed time scale of each of the multiple lifetime wear indicator functions based on the economic criterion.

5. The method of claim 2, wherein said determining the given threshold value comprises implementing a random search of the obtained set of input time series.

6. The method of claim 5, wherein said determining the given threshold value comprises selecting the given threshold value from multiple threshold values derived from the random search for the transformed time scale of each of the multiple lifetime wear indicator functions based on the economic criterion.

7. The method of claim 1, wherein the economic criterion comprises average maintenance cost per unit runtime.

8. The method of claim 1, wherein the economic criterion comprises average maintenance cost per unit work.

9. The method of claim 1, wherein the one or more economic parameters comprise scheduled component repair costs.

10. The method of claim 1, wherein the one or more economic parameters comprise unscheduled component repair costs.

11. The method of claim 1, wherein the one or more economic parameters comprise a variable cost per unit runtime.

12. A computer program product, the computer program product comprising a non-transitory computer readable storage medium having program instructions embodied therewith, the program instructions executable by a computing device to cause the computing device to:

determine, for each of multiple lifetime wear indicator functions associated with a vehicular component, wherein each lifetime wear indicator function comprises a transformed time scale plotting wear indicator values over a period of time, a corresponding given threshold value on the transformed time scale;

calculate, for each of the multiple lifetime wear indicator functions:

a survival probability function for the vehicular component based on the transformed time scale of each of the multiple lifetime wear indicator functions;

an average runtime of the vehicular component prior to failure for each instance wherein the vehicular component failed prior to the corresponding given threshold value; and an average runtime of the vehicular component prior to a scheduled replacement for each instance wherein the vehicular component reached the corresponding given threshold value;

calculate, for each of the multiple lifetime wear indicator functions, an economic criterion value for the corresponding given threshold value based on (i) the survival probability function, (ii) the average runtime of the vehicular component prior to failure, (iii) the average runtime of the vehicular component prior to a scheduled replacement, and (iv) one or more economic parameters;

compare the multiple lifetime wear indicator functions for the vehicular component at the corresponding given threshold value to identify one of the multiple lifetime wear indicator functions that optimizes the economic criterion value; and generate a replacement policy for the vehicular component, wherein said replacement policy comprises (i) the identified lifetime wear indicator function and (ii) the given threshold value corresponding to the identified lifetime wear indicator function.

13. A system comprising:

a memory; and at least one processor coupled to the memory and configured for:

determining, for each of multiple lifetime wear indicator functions associated with a vehicular component, wherein each lifetime wear indicator function comprises a transformed time scale plotting wear indicator values over a period of time, a corresponding given threshold value on the transformed time scale;

calculating, for each of the multiple lifetime wear indicator functions:

a survival probability function for the vehicular component based on the transformed time scale of each of the multiple lifetime wear indicator functions;

an average runtime of the vehicular component prior to failure for each instance wherein the vehicular component failed prior to the corresponding given threshold value; and an average runtime of the vehicular component prior to a scheduled replacement for each instance wherein the vehicular component reached the corresponding given threshold value;

calculating, for each of the multiple lifetime wear indicator functions, an economic criterion value for the corresponding given threshold value based on (i) the survival probability function, (ii) the average runtime of the vehicular component prior to failure, (iii) the average runtime of the vehicular component prior to a scheduled replacement, and (iv) one or more economic parameters;

comparing the multiple lifetime wear indicator functions for the vehicular component at the corresponding given threshold value to identify one of the multiple lifetime wear indicator functions that optimizes the economic criterion value; and generating a replacement policy for the vehicular component, wherein said replacement policy comprises (i) the identified lifetime wear indicator function and (ii) the given threshold value corresponding to the identified lifetime wear indicator function.

14. A method comprising the following steps:

for each of multiple lifetime wear indicator functions associated with a vehicular component, wherein each lifetime wear indicator function comprises a transformed time scale plotting wear indicator values over a period of time, determining multiple corresponding candidate threshold values on the transformed time scale;

calculating, for each of the multiple lifetime wear indicator functions at each of the multiple corresponding candidate threshold values:

a survival probability function for the vehicular component based on the transformed time scale of each of the multiple lifetime wear indicator functions;

an average runtime of the vehicular component prior to failure for each instance wherein the vehicular component failed prior to the corresponding candidate threshold value; and an average runtime of the vehicular component prior to a scheduled replacement for each instance wherein the vehicular component reached the corresponding candidate threshold value;

calculating, for each of the multiple lifetime wear indicator functions, an economic criterion value for each of the multiple corresponding candidate threshold values based on (i) the survival probability function, (ii) the average runtime of the vehicular component prior to failure, (iii) the average runtime of the vehicular component prior to a scheduled replacement, and (iv) one or more economic parameters;

comparing, for each of the multiple lifetime wear indicator functions for the vehicular component, the economic criterion value for each of the multiple candidate threshold values to identify one of the multiple candidate threshold values that optimizes the economic criterion value for the corresponding lifetime wear indicator function;

comparing the multiple lifetime wear indicator functions for the vehicular component at the candidate threshold value that optimizes the economic criterion value for the corresponding lifetime wear indicator function to identify one of the multiple lifetime wear indicator functions that optimizes the economic criterion value; and generating a replacement policy for the vehicular component, wherein said replacement policy comprises (i) the identified lifetime wear indicator function and (ii) the threshold value that optimizes the economic criterion value for the corresponding lifetime wear indicator function;

wherein at least one of the steps is carried out by a computing device.

15. The method of claim 14, comprising:

obtaining a set of input time series pertaining to the vehicular component, wherein each input time series comprises a collection of values calculated from the multiple lifetime wear indicator functions for the vehicular component.

16. The method of claim 14, wherein the economic criterion comprises average maintenance cost per unit runtime.

17. The method of claim 14, wherein the economic criterion comprises average maintenance cost per unit work.

18. The method of claim 14, wherein the one or more economic parameters comprise scheduled component repair costs.

19. The method of claim 14, wherein the one or more economic parameters comprise unscheduled component repair costs.

20. The method of claim 14, wherein the one or more economic parameters comprise a variable cost per unit runtime.

* * * * *